US009621093B2

(12) United States Patent
Amemiya et al.

(10) Patent No.: US 9,621,093 B2
(45) Date of Patent: Apr. 11, 2017

(54) MOTOR CONTROL DEVICE

(71) Applicants: Yoshiyuki Amemiya, Tokyo (JP); Satoru Terashima, Tokyo (JP)

(72) Inventors: Yoshiyuki Amemiya, Tokyo (JP); Satoru Terashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/758,364

(22) PCT Filed: Feb. 21, 2013

(86) PCT No.: PCT/JP2013/054364
§ 371 (c)(1),
(2) Date: Jun. 29, 2015

(87) PCT Pub. No.: WO2014/128887
PCT Pub. Date: Aug. 28, 2014

(65) Prior Publication Data
US 2015/0333682 A1 Nov. 19, 2015

(51) Int. Cl.
*H02P 6/12* (2006.01)
*H02P 21/22* (2016.01)
(Continued)

(52) U.S. Cl.
CPC .............. *H02P 21/22* (2016.02); *H02P 6/181* (2013.01); *H02P 21/0021* (2013.01);
(Continued)

(58) Field of Classification Search
CPC ........ H02P 21/13; H02P 25/089; H02P 23/12; H02P 21/141; H02P 21/18; H02P 21/22; H02P 21/00
(Continued)

(56) References Cited

U.S. PATENT DOCUMENTS 5,652,495 A 7/1997 Narazaki et al.
5,877,603 A 3/1999 Uchida et al.
(Continued)

FOREIGN PATENT DOCUMENTS

EP 2 413 494 A1 2/2012
JP 8-266099 A 10/1996
(Continued)

OTHER PUBLICATIONS

International Search Report for PCT/JP2013/054364 dated May 14, 2013 [PCT/ISA/210].
(Continued)

*Primary Examiner* — Eduardo Colon Santana
*Assistant Examiner* — Bickey Dhakal
(74) *Attorney, Agent, or Firm* — Sughrue Mion, PLLC; Richard C. Turner

(57) ABSTRACT

To achieve smooth switching of control without fluctuations in speed and torque, an excitation current command is allowed to transit linearly or in accordance with the function of speed between a value under sensorless vector control and a value under low-speed region control in accordance with a speed command or estimated speed in a speed region where the control is switched or in an adjacent speed region where sensorless vector control is performed. Therefore, abrupt variations in excitation current are reduced before and after the switching of the control.

1 Claim, 5 Drawing Sheets

(51) Int. Cl.
*H02P 21/05* (2006.01)
*H02P 21/00* (2016.01)
*H02P 6/18* (2016.01)
*H02P 27/08* (2006.01)

(52) U.S. Cl.
CPC ............ *H02P 21/05* (2013.01); *H02P 27/085* (2013.01); *H02P 2207/05* (2013.01)

(58) Field of Classification Search
USPC ............ 318/400.15, 400.32, 400.02, 400.26
See application file for complete search history.

(56) References Cited

U.S. PATENT DOCUMENTS

| | | | |
|---|---|---|---|
| 7,679,308 | B2 | 3/2010 | Tomigashi |
| 8,269,436 | B2 * | 9/2012 | Hashimoto ........... H02P 29/026 318/400.01 |
| 2004/0012367 | A1 | 1/2004 | Takahashi et al. |
| 2007/0236167 | A1 * | 10/2007 | Tomigashi .............. H02P 23/14 318/721 |
| 2010/0045218 | A1 | 2/2010 | Tomigashi |
| 2010/0237821 | A1 | 9/2010 | Kitanaka |
| 2014/0225548 | A1 | 8/2014 | Xu et al. |

FOREIGN PATENT DOCUMENTS

| | | |
|---|---|---|
| JP | 9-84400 A | 3/1997 |
| JP | 2003-88157 A | 3/2003 |
| JP | 2006-87263 A | 3/2006 |
| JP | 2008-11616 A | 1/2008 |
| JP | 2010-130731 A | 6/2010 |
| JP | 2010-241165 A | 10/2010 |
| JP | 2011-10481 A | 1/2011 |
| JP | 2012-19626 A | 1/2012 |
| JP | 2012019626 A * | 1/2012 |
| WO | 2010/109528 A1 | 9/2010 |

OTHER PUBLICATIONS

Written Opinion for PCT/JP2013/054364 dated May 14, 2013 [PCT/ISA/237].
Communication dated Dec. 2, 2016, from the State Intellectual Property Office of People's Republic of China in counterpart Application No. 201380073492.0.
Communication from the United States Patent and Trademark Office mailed on Dec. 15, 2016 for the divisional U.S. Appl. No. 15/152,008.

* cited by examiner

MOTOR CONTROL DEVICE

CROSS REFERENCE TO RELATED APPLICATIONS

This application is a National Stage of International Application No. PCT/JP2013/054364, filed on Feb. 21, 2013, the contents of all of which are incorporated herein by reference in their entirety.

FIELD

The present invention relates to a motor control device.

BACKGROUND

To control a motor at high speeds with high precision, it is necessary to generate rotating magnetic flux in accordance with the magnetic pole position of the rotor. However, using a position sensor to detect the magnetic pole position involves various problems, such as high cost, vulnerability to vibration and heat, increase in motor size, increased wiring, and restrictions on wiring length.

Heretofore, such problems have prompted the development of methods to detect the magnetic pole position without the use of a position sensor, and a method of estimating the magnetic pole position of a rotor by using the induced voltage caused by the magnetic flux of the permanent magnet during the rotation (sensorless vector control) is widely known. This method has drawbacks in that it is difficult to detect or estimate the induced voltage at low speeds where the induced voltage is small, degradation in precision with which the magnetic pole position of the rotor is detected, and degradation of precision with which the speed is estimated.

A solution to this problem is to use a widely known method of controlling the synchronous current at low speeds, in which a predetermined current vector is allowed to flow during any control phase and a synchronous phase obtained by integrating the speed command is provided as the control phase so that the speed of a motor follows speed commands. Then, when the speed command achieves a value that allows sufficient detection or estimation of the induced voltage, synchronous current control is switched to sensorless vector control (for example, see Patent Literature 1).

For a motor with magnetic salience, there is a known method of correcting the phase estimation error in sensorless vector control in a low speed region by using a method of applying a high-frequency voltage command for use in position estimation to estimate the magnetic pole position of a rotor from the detected current (a high-frequency superposition scheme), and, when the speed command or estimated speed achieves a value that allows sufficient detection or estimation of induced voltage, of migrating to the use of only sensorless vector control (for example, see Patent Literatures 2 and 3).

Additionally, high-efficiency control, such as maximum torque control with reluctance torque and maximum efficiency control that takes into consideration the core loss and the like, is widely known (for example, see Patent Literature 4 for the maximum torque control, and Patent Literature 5 for the maximum efficiency control).

CITATION LIST

Patent Literature

Patent Literature 1: Japanese Patent Application Laid-Open No. 2012-19626

Patent Literature 2: WO/2010/109528

Patent Literature 3: Japanese Patent Application Laid-Open No. 2008-11616

Patent Literature 4: Japanese Patent Application Laid-Open No. 2003-88157

Patent Literature 5: Japanese Patent Application Laid-Open No. H08-266099

SUMMARY

Technical Problem

In the case where the maximum torque control with reluctance torque or the maximum efficiency control is performed with sensorless vector control, because the excitation current is allowed to flow in accordance with the torque current, it becomes necessary to allow the excitation current to flow in the negative direction depending on the magnitude of the torque current.

In contrast, in the case of the low-speed region control, it is necessary to allow zero excitation current to flow or to allow the excitation current to flow in the positive direction by, for example, allowing a relatively strong excitation current to flow with the torque current fixed at zero during synchronous current control (Patent Literature 1), or by allowing a constant torque current to flow with the excitation current fixed at zero (Patent Literature 3).

Additionally, in the case of the high-frequency superposition scheme, which allows high-frequency current to flow, larger losses are involved in comparison with the case with no application of high-frequency voltage and also motor parameters vary; therefore, it is difficult to perform control such as the maximum torque control. Therefore, the excitation current command used before the application of the high-frequency voltage is a constant value near zero in a speed region in which the high-frequency voltage is applied.

In short, there is a problem in that switching between low-speed region control and sensorless vector control under conditions where the load of a certain magnitude is applied causes the excitation current to abruptly vary before and after the switching of the control, and this leads to fluctuations in speed and torque.

The present invention has been achieved in view of the above, and an objective of the present invention is to provide a motor control device that is capable of restricting abrupt variations in excitation current before and after the switching of the control when loads are applied and that is capable of switching the control smoothly without fluctuation in speed and torque.

Solution to Problem

In order to solve the above problems and achieve the objective, the present invention relates to a motor control device that includes: a voltage application unit applying AC voltage to a motor in accordance with drive voltage commands; a current detector detecting motor currents flowing through the motor; an estimation unit calculating and outputting an estimated phase and an estimated speed on the basis of the drive voltage commands and the motor currents, the estimated phase being an estimated value for a rotor position of the motor, and the estimated speed being an estimated value for a rotation speed of the motor; and a controller outputting the drive voltage commands such that control current vectors obtained by performing coordinate conversion of the motor currents into an arbitrary control phase match control current vector commands on the arbitrary control phase. The controller creates a control current vector command on the arbitrary control phase on the basis of a control current vector command obtained by performing control such that a speed command input from an outside source matches the estimated speed, the control phase, the estimated phase, the speed command, and a control current vector set in advance, and switches between a synchronous phase that is arbitrarily set and the estimated phase to provide the arbitrary control phase.

Advantageous Effects of Invention

The present invention achieves the effect of restricting abrupt variations in the excitation current before and after the switching of control when loads are applied and the effect of switching the control smoothly without fluctuation in speed and torque.

DESCRIPTION OF EMBODIMENTS

Exemplary embodiments of a motor control device according to the present invention will now be described in detail with reference to the drawings. The present invention is not limited to the embodiments.

First Embodiment

Figure 1:
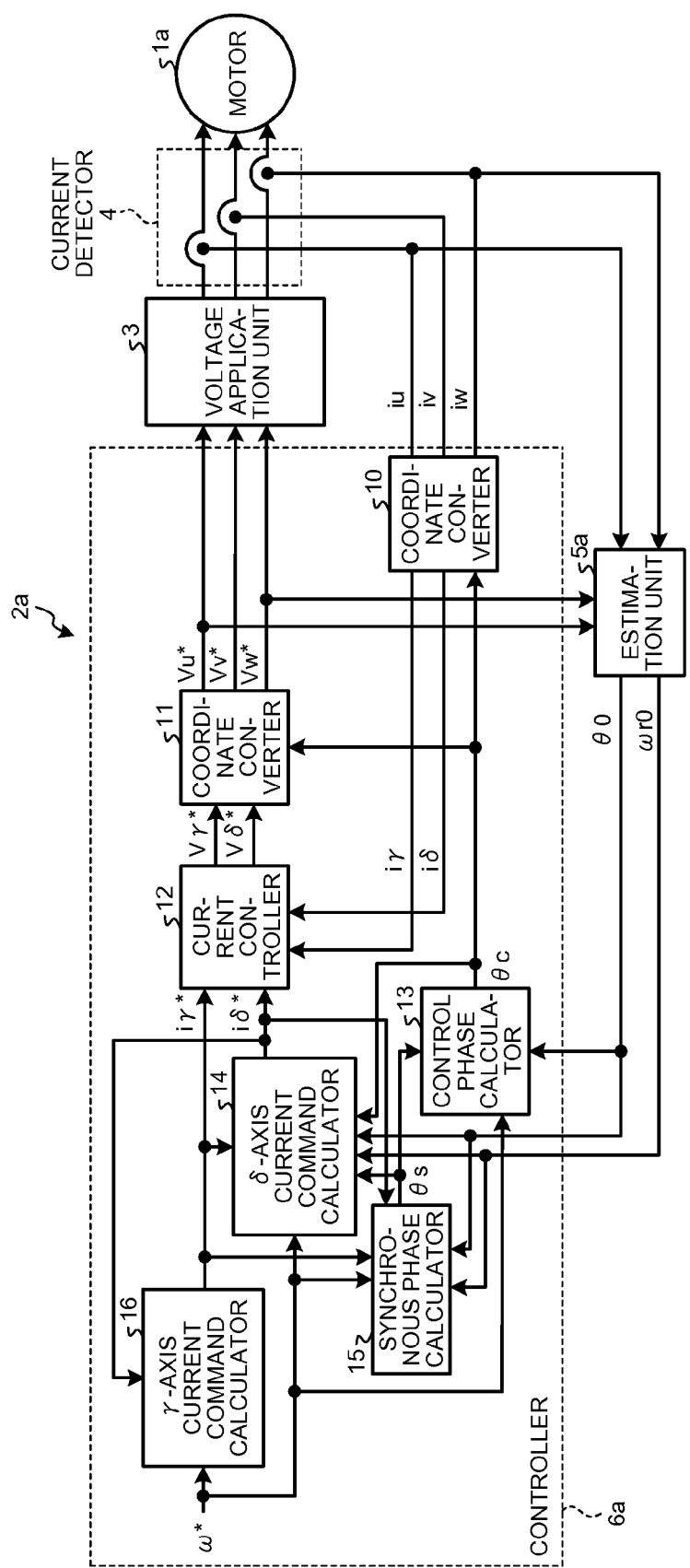
FIG. 1 is a block diagram illustrating the configuration of a motor control device according to a first embodiment of the present invention.

FIG. 1 is a block diagram illustrating the configuration of a motor control device according to a first embodiment of the present invention. The first embodiment describes a case in which switching is performed from synchronous current control, via switching control, to sensorless vector control or from sensorless vector control, via switching control, to synchronous current control.

Note that sensorless vector control is a method of estimating the rotation speed of a motor from the induced voltage of the motor without providing a position sensor attached to the motor or without using, if provided, a position sensor attached to the motor and of controlling the motor speed such that the estimated speed matches a speed command. Synchronous current control is a method of allowing a predetermined current vector to flow during any control phase and of providing a synchronous phase set in as the same manner as the control phase so as to control the motor speed such that the rotation speed of the motor follows speed commands. This method is used in a low speed region in which the detection or estimation of the induced voltage is difficult.

In FIG. 1, a motor 1a is, for example, a three-phase AC permanent magnet synchronous motor, in which the direction of magnetic flux created by the magnetic poles of its rotor (the central axis of a permanent magnet) is designated as a d-axis, and an axis electrically and magnetically orthogonal to the d-axis (an axis between permanent magnets) is designated as a q-axis. Estimated axes provided for control are designated as a γ-axis and a δ-axis, respectively corresponding to the d-axis and the q-axis. The d-axis is also called a magnetic flux axis and the q-axis is also called a torque axis.

A motor control device 2a according to the first embodiment controls the driving of the motor 1a and includes a voltage application unit 3, a current detector 4, estimation unit 5a, and a controller 6a. The motor control device 2a has the estimated axes for the control, which are the γ-axis and the δ-axis corresponding to the d-axis and the q-axis respectively, and is configured to control the motor 1a by using the γ-axis and the δ-axis.

The voltage application unit 3 is a semiconductor power converter, such as a pulse width modulation (PWM) inverter, that converts DC voltage to pulse-width-modulated three-phase AC voltage on the basis of drive voltage commands Vu*, Vv*, and Vw*, which are the outputs of the controller 6a, and applies the modulated voltage to the motor 1a.

The current detector 4 is a device, e.g., a current transformer, that is installed on a power line connecting the motor 1a to the voltage application unit 3 and that also detects three-phase motor currents iu, iv, and iw flowing between the motor 1a and the voltage application unit 3 from the power line so as to output the detected data to the controller 6a. While three phase currents are detected as illustrated in FIG. 1, any two of the three phase currents may be detected and the remaining phase current may be obtained by calculation on the basis of the three-phase equilibrium of motor currents.

The estimation unit 5a calculates an estimated phase (estimated position) θ0, which is an estimated value for the rotor position of the motor 1a, and an estimated speed ωr0, which is an estimated value for the rotation speed of the motor 1a, on the basis of the motor currents iu and iw, which are the outputs of the current detector 4, and drive voltage commands Vu* and Vw*, which are the outputs of the controller 6a, so as to output them to the controller 6a. Here, current vectors on the estimated phase θ0 match control current vectors id and iq on the d-axis and the q-axis. For the estimate calculation, drive voltage commands and motor currents of two phases of an appropriate combination may be used, or all three phase drive voltage commands and motor currents may be used.

Since the estimation method of the estimation unit 5a uses the induced voltage, its calculation accuracy is low for the estimated phase in the low speed region. Hence, it is preferable that the estimation unit 5a be stopped when the absolute value |ω*| of a speed command ω* input from an external source is less than a preset reference value ω1v1, and the estimation unit 5a be activated when the absolute value |ω*| is equal to or more than the reference value ω1v1. It is also advisable that the reference value ω1v1 be set to the minimum value when the estimated phase θ0 and the estimated speed ωr0 become the desired values in the calculation accuracy. While the estimation may be performed with, for example, a method as described in Patent Literature 1, it is not, however, limited thereto, and any method that estimates the rotor position and the speed of the motor 1a may be used.

The controller 6a performs three main control operations (1) to (3), which are described below in the first embodiment.

(1) The controller 6a creates γδ-axis control current vector commands iγ* and iδ* on any control phase θc set on the basis of a synchronous phase θs, the estimated phase θ0, and the speed command ω*; creates the drive voltage commands Vu*, Vv*, and Vw* such that γ-axis and the δ-axis control current vectors iγ and iδ, which are obtained by converting the motor currents iu and iw into the control phase θc, match the γ-axis and the δ-axis control current vector commands iγ* and iδ*; and outputs the created data results to the voltage application unit 3.

(2) The controller 6a creates the δ-axis control current vector command iδ* on the basis of an actual current command vector obtained by performing control such that the speed command ω* matches the estimated speed ωr0, the control phase θc, the estimated phase θ0, and the γ-axis control current vector iγ, and it switches alternately between the synchronous phase θs, which is arbitrarily set, and the estimated phase θ0 so as to provide the control phase θc. Note that, in the first embodiment, the synchronous phase θs is set to a value obtained by integrating the speed command ω*.

Figure 2:
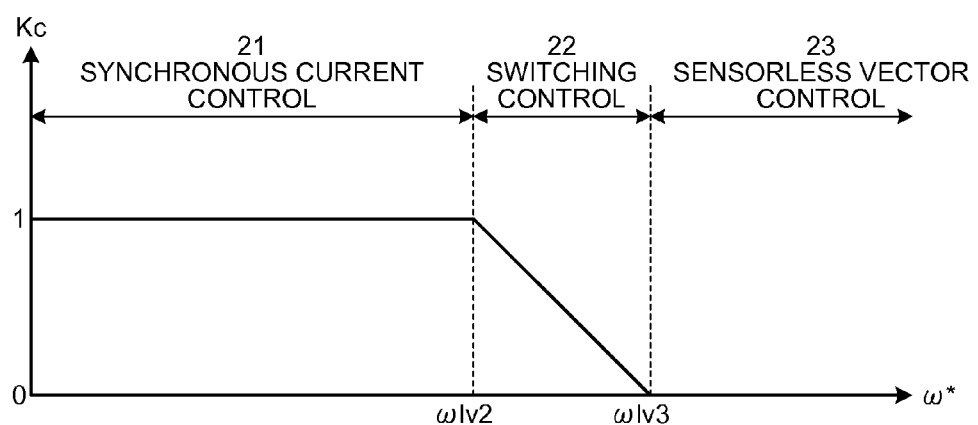
FIG. 2 is a characteristic diagram describing the phases of three control regions selected by the controller illustrated in FIG. 1.

(3) The controller 6a selects from three types of control method, namely synchronous current control, switching control, and sensorless vector control in accordance with the magnitude of the speed command ω* input externally so as to control, for example, as illustrated in FIG. 2. FIG. 2 is a characteristic diagram for describing the phases of the three control regions selected by the controller illustrated in FIG. 1. In FIG. 2, the horizontal axis represents the speed command ω* input externally. The vertical axis represents a "phase proportionality coefficient Kc", which is created in the controller 6a described later.

With reference to the horizontal axis in FIG. 2, the controller 6a selects the synchronous current control 21 when the absolute value |ω*| of the speed command ω* ranges from zero to less than a preset reference value ω1v2 (ω1v2>ω1v1); selects a switching control 22 when the absolute value |ω*| ranges from the reference value ω1v2 to less than a preset reference value ω1v3 (ω1v3>ω1v2); and selects a sensorless vector control 23 when the absolute value |ω*| is equal to or more than a reference value ω1v3, so as to perform the selected control in the respective speed periods.

To achieve such control, the controller 6a includes coordinate converters 10 and 11, a current controller 12, a control phase calculator 13, a δ-axis current command calculator 14, a synchronous phase calculator 15, and a γ-axis current command calculator 16. These components will be described below.

The synchronous phase calculator 15 receives the speed command ω*, the γ-axis control current vector command iγ* calculated by the γ-axis current command calculator 16, the δ-axis control current vector command iδ* calculated by the δ-axis current command calculator 14, and the estimated phase θ0 and the estimated speed ωr0 calculated by the estimation unit 5a. On the basis of these inputs, the synchronous phase calculator 15 calculates the synchronous phase θs to be used in the three control periods illustrated in FIG. 2 and outputs them.

That is, during synchronous current control (|w*|<ω1v2), the synchronous phase calculator 15 outputs a synchronous phase θs that is obtained by integrating the speed command ω*. During switching control (ω1v2≤|ω*|<ω1v3), the synchronous phase calculator 15 outputs a synchronous phase θs that is obtained by integrating the estimated speed ωr0. During sensorless vector control (ω1v3≤|ω*|), as described in, for example, Patent Literature 1, the synchronous phase calculator 15 adds to the estimated phase θ0 with a phase obtained by performing an inverse sine calculation on the δ-axis control current vector command iδ* and the γ-axis control current vector command iγ* from synchronous current control, and then it outputs the phase made from the addition as the synchronous phase θs. These three types of synchronous phase θs are input to the control phase calculator 13 and the δ-axis current command calculator 14.

The control phase calculator 13 receives the speed command ω*, the synchronous phase θs output by the synchronous phase calculator 15, and the estimated phase θ0 calculated by the estimation unit 5a. Then, on the basis of these inputs, the control phase calculator 13 sets the phase proportionality coefficient Kc for each control, as illustrated in FIG. 2 on the vertical axis, on the basis of the speed command ω*, so that the switching between the synchronous current control 21 and the switching control 22 and the switching between the switching control 22 and the sensorless vector control 23, as illustrated in FIG. 2, are performed smoothly. The control phase calculator 13 applies the phase proportionality coefficient Kc that has been set to be given by an expression (1) so as to calculate and output the control phase θc in accordance with the phase proportionality coefficient Kc.

$$\theta c = Kc \cdot \theta s + (1-Kc) \cdot \theta 0 \quad (1)$$

In the example illustrated in FIG. 2, the phase proportionality coefficient Kc is set to Kc=1 for synchronous current control (|ω*|<ω1v2). The phase proportionality coefficient Kc is set such that it drops linearly from Kc=1 toward Kc=0 for switching control (ω1v2|ω*|<ω1v3). It is set to Kc=0 for sensorless vector control (ω1v3≤|(ω*|).

Because the phase proportionality coefficient Kc as described above is applied to the expression (1), the synchronous phase θs input from the synchronous phase calculator 15 is used as the control phase θc for synchronous current control (|ω*|<ω1v2), and the estimated phase θ0 input from the estimation unit 5a is used as the control phase θc for sensorless vector control (ω1v3≤|ω*|). As the control phase θc for switching control (ω1v2≤|ω*|<ω1v3), a phase obtained by weighting the synchronous phase θs and the estimated phase θ0 with the phase proportionality coefficient Kc are used.

While the phase proportionality coefficient Kc, which changes in proportion to the speed command ω*, is used as the coefficient in the first embodiment, any coefficient may be used as long as it changes such that the synchronous phase θs is obtained when the speed command ω* is the reference value ω1v2 and that the estimated phase θ0 is obtained when the speed command ω* is the reference value ω1v3. The control phase θc obtained by the control phase calculator 13 is input to the δ-axis current command calculator 14 and the coordinate converters 10 and 11.

Subsequently, the δ-axis current command calculator 14 receives the speed command ω*, the γ-axis control current vector command iγ*, the synchronous phase θs, the control phase θc, the estimated phase θ0, and the estimated speed ωr0 so as to create the δ-axis control current vector command iδ*, which is one of the two control current vector commands. The δ-axis control current vector command iδ* that has been created is input to the current controller 12, the γ-axis current command calculator 16, and the synchronous phase calculator 15 described above.

The δ-axis current command calculator 14 creates the δ-axis control current vector command iδ* on the basis of, for example, as described in Patent Literature 1, the actual current command vector that is obtained by controlling the speed command ω* such that it matches the estimated speed ωr0; the control phase θc; the estimated phase θ0; and the γ-axis control current vector command iγ*, which is the other one of the two control current vector commands. Note that the δ-axis current command calculator 14 sets the δ-axis control current vector command iδ* to zero for synchronous current control.

Figure 3:
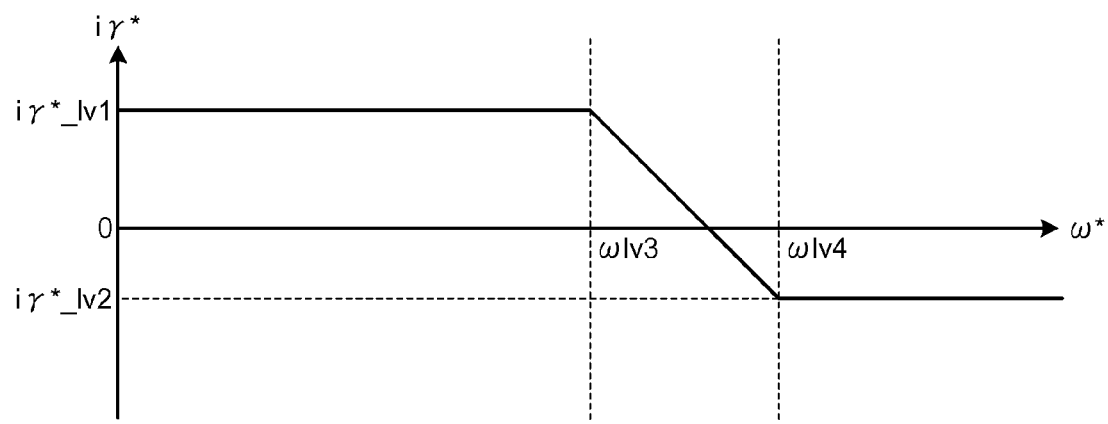
FIG. 3 is a characteristic diagram illustrating an example relation (1) between a speed command ω* and a γ-axis control current vector command calculated by the γ-axis current command calculator illustrated in FIG. 1.
Figure 4:
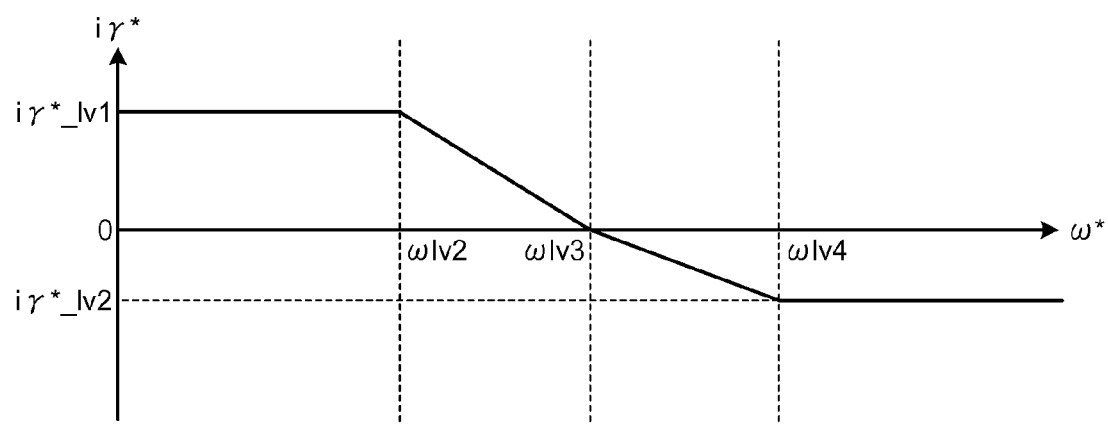
FIG. 4 is a characteristic diagram illustrating an example relation (2) between the speed command ω* and the γ-axis control current vector command calculated by the γ-axis current command calculator illustrated in FIG. 1.

Subsequently, the γ-axis current command calculator 16 receives the speed command ω* and the δ-axis control current vector command iδ* so as to create the γ-axis control current vector command iγ*. The γ-axis control current vector command iγ* that has been created is input to the current controller 12. FIG. 3 is a characteristic diagram illustrating an example relation (1) between the speed command and the γ-axis control current vector command calculated by the γ-axis current command calculator illustrated in FIG. 1. FIG. 4 is a characteristic diagram illustrating an example relation (2) between the speed command and the γ-axis control current vector command calculated by the γ-axis current command calculator illustrated in FIG. 1.

In FIGS. 3 and 4, the horizontal axis represents the speed command ω* and the vertical axis represents the γ-axis control current vector command iγ*. The γ-axis current command calculator 16 creates the γ-axis control current vector command iγ* in accordance with the speed command ω* and the δ-axis control current vector command iδ*, as illustrated in FIG. 3 or 4. The γ-axis control current vector command iγ*, which has been created, is input to the current controller 12, the δ-axis current command calculator 14, and the synchronous phase calculator 15 described above.

In FIG. 3, in the speed periods of synchronous current control and switching control, when the absolute value |ω*| of the speed command ω* is smaller than the reference value ω1v3, i.e., |ω*|<ω1v3, the γ-axis control current vector command iγ* is a constant value iγ*_1v1, if the speed period of equal to or more than a reference value ω1v4 that is apart from the reference value ω1v3 by some range, the γ-axis control current vector command iγ* is a predetermined value iγ*_1v2 that is used to perform the maximum efficiency control and the maximum torque control during sensorless vector control. In this example, in the speed region of ω1v3≤|ω*|<ω1v4, the γ-axis control current vector command iγ* is allowed to be a linear transition between the constant value iγ*_1v1 and the predetermined value iγ*_1v2 in accordance with the speed command ω*. Note that the transition may be adopted with a function in accordance with the speed command ω*.

In FIG. 4, for synchronous current control (|ω*|<ω1v2), the γ-axis control current vector command iγ* is the constant value iγ*_1v1; for switching control (ω1v2≤|ω*|<ω1v3), the γ-axis control current vector command iγ* is allowed to be a linear transition between the constant value iγ*_1v1 and zero or a value near zero in accordance with the phase proportionality coefficient Kc; and for sensorless vector control (ω1v3≤|ω*|) in the speed period equal to or more than the reference value ω1v4 that is apart from the reference value ω1v3 by some range, the γ-axis control current vector command iγ* is the predetermined value iγ*_1v2 that is used to perform the maximum efficiency control and the maximum torque control during sensorless vector control. In this example, in the speed region of ω1v3≤|ω*|<ω1v4, the γ-axis control current vector command iγ* is allowed to be a linear transition between zero or a value near zero and the predetermined value iγ*_1v2 in accordance with the speed command ω*. Note that the transition may be a function of the speed command ω*.

Here, the constant value iγ*_1v1 for the γ-axis control current vector command iγ* may be an arbitrary value but is desirable to set it to a value less than the continuous rated current of the motor 1a.

Here, the predetermined value iγ*_1v2 for the γ-axis control current vector command iγ* may be obtained by using an expression (2) when the maximum torque control is performed. Alternatively, for example, when the maximum efficiency control is performed, the predetermined value iγ*_1v2 may be set in accordance with the δ-axis control current vector command iδ* by using an approximation expression, table values, and the like obtained in advance.

$$i\gamma^*\_1v2 = \Phi a/\{2(Lq-Ld)\} - \sqrt{[\Phi a^2/\{4(Lq-Ld)^2\} + i\delta^{*2}]} \quad (2)$$

In the expression (2), Φa represents the armature flux linkage due to the permanent magnet, and Ld and Lq represent the inductance of the d-axis and the q-axis, respectively.

Here, as a precondition for using the expression (2), it is required that the d-axis and the q-axis match the γ-axis and the δ-axis, respectively, and thus, it is only during sensorless vector control that the control with the predetermined value iγ*_1v2 is operable.

Note that, because the δ-axis current command calculator 14 calculates the δ-axis control current vector command iδ* in such a manner that the difference between the speed command ω* and the estimated speed ωr0 is reduced, the δ-axis control current vector command iδ* and the γ-axis control current vector command iγ* also become vibrational if the variability range of the estimated speed ωr0 is large. To prevent this, it is advisable that, when the predetermined value iγ*_1v2, which is used in maximum efficiency control, is calculated in accordance with the δ-axis control current vector command iδ*, the γ-axis current command calculator 16 filters the δ-axis control current vector command iδ* for use in the calculation in order to remove vibrational components.

The current controller 12 performs proportional integral control such that the control current vectors iγ and iδ of the γ-axis and δ-axis, which are the outputs of the coordinate converter 10, match the control current vector commands iγ* and iδ* of the γ-axis and δ-axis, and it then outputs the control results as control voltage vectors Vγ* and Vδ* to the coordinate converter 11. The coordinate converter 11 converts the control voltage vectors Vγ* and Vδ* that are input thereto into the drive voltage commands Vu*, Vv*, and Vw* on the control phase θc. The drive voltage commands Vu*, Vv*, and Vw* are all input to the voltage application unit 3, and two drive voltage commands Vu* and Vw* are input to the estimation unit 5a.

The coordinate converter 10 converts the motor currents iu, iv, and iw that have been detected into the control current vectors iγ and iδ on the control phase θc. The control current vectors iγ and iδ resulting from the conversion are input to the current controller 12.

While the switching between synchronous current control and sensorless vector control is performed by using a method, for example, as described in Patent Literature 1 in the first embodiment, the method is not limited thereto. Since the γ-axis control current vector command has different values during synchronous current control and during sensorless vector control, any method may be used as long as the switching of the control is performed in accordance with the speed command or the estimated speed.

As described above, the first embodiment is capable of preventing abrupt variations in the γ-axis control current vector command iγ* before and after the switching of the control with a load applied, and thus it is capable of switching the control smoothly without fluctuations in speed and torque.

Second Embodiment

Figure 5:
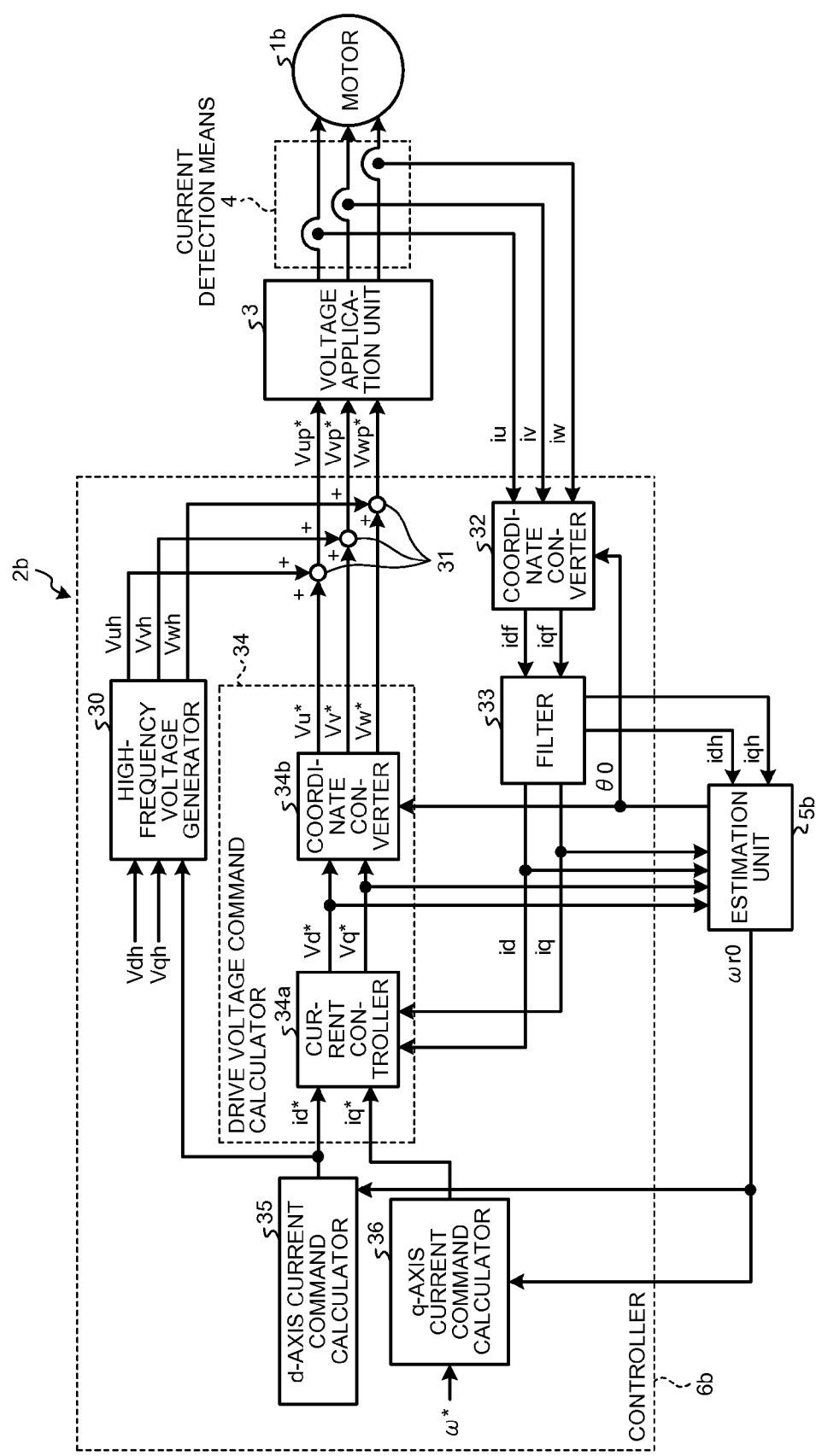
FIG. 5 is a block diagram illustrating the configuration of a motor control device according to a second embodiment of the present invention.

FIG. 5 is a block diagram illustrating the configuration of a motor control device according to a second embodiment of the present invention. In FIG. 5, components identical or similar to those illustrated in FIG. 1 (the first embodiment) are designated with identical reference signs. The description below will focus on parts related to the second embodiment.

In the second embodiment, the drive control in total is provided as sensorless vector control, in which the phase estimation error correction of the high-frequency superposition scheme is performed in the low speed region, and the maximum efficiency control or the maximum torque control by only sensorless vector control is performed without the phase estimation error correction of the high-frequency superposition scheme in the mid-to-high speed region, as described below. Here, sensorless vector control is a method of estimating the rotation speed of a motor from the induced voltage of the motor, without a position sensor provided to the motor or without the use of a position sensor, if provided, to the motor, and of controlling the motor speed such that the estimated speed matches a speed command, as described above.

In FIG. 5, a motor 1b is, for example, a permanent magnet-embedded synchronous motor including a permanent magnet embedded in its rotor. In the case of the interior permanent magnet-embedded synchronous motor 1b also, the direction of magnetic flux created by the magnetic poles of the rotor (the central axis of the permanent magnet) is designated as the d-axis, and an axis electrically and magnetically orthogonal to the d-axis (an axis between permanent magnets) is designated as the q-axis. The d-axis is also called a magnetic flux axis and the q-axis is also called a torque axis. The flux linkage due to a d-axis current id is limited by a magnet that has low magnetic permeability disposed in the way; whereas the flux linkage due to a q-axis current iq is increased as it passes through a material that has higher magnetic permeability (e.g., silicon steel) than the magnets, which is not illustrated therein. During a steady-state operation of the motor 1b, the magnetic resistance of the d-axis becomes larger than that of the q-axis, and an inductance Ld of the d-axis becomes smaller than an inductance Lq of the q-axis. That is, a salience ratio Lq/Ld, which is the ratio of the inductance Lq of the q-axis to the inductance Ld of the d-axis, is a value larger than one. In other words, the motor 1b has salience.

A motor control device 2b according to the second embodiment controls the driving of the motor 1b and includes voltage application unit 3, current detector 4, estimation unit 5b, and a controller 6b. The motor control device 2b uses the salience ratio of the motor 1b being larger than one during the steady-state operation, in other words the salience of the motor 1b, so as to estimate the magnetic pole position of the rotor and controls the drive speed of the motor 1b by using the estimated magnetic pole position. Note that the voltage application unit 3 and the current detector 4 are similar to those in the first embodiment and the description thereof will be omitted here.

The controller 6b, of which the overall configuration has a drive control that uses sensorless vector control, operates the phase estimation error correction of the high-frequency superposition scheme in the low speed region, and operates the maximum efficiency control or the maximum torque control by using only sensorless vector control without the use of the phase estimation error correction of the high-frequency superposition scheme in the mid-to-high speed region; and it includes a high-frequency voltage generator 30, adders 31, a coordinate converter 32, a filter 33, a drive voltage command calculator 34 including a current controller 34a and a coordinate converter 34b, a d-axis current command calculator 35, and a q-axis current command calculator 36.

The high-frequency voltage generator 30 receives, as a control signal to start and stop the operation, a d-axis control current vector command id* calculated and output by the d-axis current command calculator 35 or an estimated speed ωr0 calculated and output by the estimation unit 5b, to be described hereinafter as a signal line (not illustrated here); and it generates, in compliance with high-frequency voltage commands Vdh and Vqh input from an external source as first high-frequency voltage commands, high-frequency voltage commands Vuh, Vvh, and Vwh, as second high-frequency voltage commands, which have different voltage and frequency from drive control voltage commands Vu*, Vv*, and Vw* output by the coordinate converter 34b in the drive voltage command calculator 34. While the high-frequency voltage commands Vuh, Vvh, and Vwh may be in principle any commands that have frequencies different from the drive control voltage commands Vu*, Vv*, and Vw*, three-phase high-frequency voltage commands, however, are used in the second embodiment.

The adders 31 superimpose the three phase high-frequency voltage commands Vuh, Vvh, and Vwh output by the high-frequency voltage generator 30 on the drive control voltage commands Vu*, Vv*, and Vw* output by the coordinate converter 34b in the drive voltage command calculator 34, and the results are then output as first drive voltage commands Vup*, Vvp*, and Vwp* to the voltage application unit 3.

The voltage application unit 3 creates three phase AC voltages on the basis of the first drive voltage commands Vup*, Vvp*, and Vwp* and applies the created three-phase AC voltages to the motor 1b. In this way, the motor currents iu, iv, and iw detected by the current detector 4 include high-frequency currents iuh, ivh, and iwh, which have the same frequency components as the high-frequency voltage commands Vuh, Vvh, and Vwh. Because the motor 1b has salience, the inductance varies with the rotor position. Thus, the amplitude of the high-frequency currents iuh, ivh, and iwh included in the motor currents iu, iv, and iw vary in accordance with the rotor position of the motor 1b.

The coordinate converter 32 performs coordinate conversion of the motor currents iu, iv, and iw including the high-frequency currents iuh, ivh, and iwh, which have varying amplitude, as described above, into control currents idf and iqf on orthogonal two axes (the d-axis–the q-axis) that rotate in synchronization with an estimated phase θ0, and it outputs the converted results to the filter 33.

The filter 33 removes, from the control currents idf and iqf on the rotational orthogonal two axes (the d-axis–the q-axis), high-frequency currents idh and iqh having the same frequency components as the high-frequency voltage commands Vdh and Vqh input from an external source to the high-frequency voltage generator 30, and it outputs the processed control current vectors id and iq to the estimation unit 5b and the current controller 34a in the drive voltage command calculator 34. The filter 33 also outputs the removed high-frequency currents idh and iqh to the estimation unit 5b. The extraction of the high-frequency currents idh and iqh is performed by, for example, a band-pass filter, a notch filter, or the like.

The estimation unit 5b calculates the estimated phase θ0 and the estimated speed ωr0 of the motor 1b on the basis of the high-frequency currents idh and iqh and the control current vectors id and iq output by the filter 33 in the controller 6b and voltage commands Vd* and Vq* output by the current controller 34a in the drive voltage command calculator 34. The estimated phase θ0 is given to the coordinate converters 32 and 34b, and the estimated speed ωr0 is given to the d-axis current command calculator 35 and the q-axis current command calculator 36. While the estimation may be performed with a method described in, for example, Patent Literature 2 of phase estimation error correction of the high-frequency superposition scheme in only the low speed region, it is not, however, limited thereto and any method that estimates the rotor position of the motor 1b may be used.

In the case where the phase estimation error correction of the high-frequency superposition scheme as described in Patent Literature 2 is performed in only the low speed region, the hysteresis may be provided for the speed at which the phase estimation error correction is started and stopped during the acceleration and deceleration so as to perform the phase estimation error correction in accordance with the magnitude of the estimated speed ωr0. Therefore frequent switching between the presence and absence of the correction due to variations in the estimated speed ωr0 can be avoided while the phase estimation error correction is performed in only the low speed region. Note that this hysteresis region (ω1v1≤|ωr0|<ω1v2) is desirably lower in speed than the speed region (|ωr0|<ω1v3) where the high-frequency voltage is superimposed. In this case, the application level of the high-frequency voltage may be also attenuated between a constant value ω1v3 and a constant value ω1v4, which is apart from a certain value ω1v3 as some range, or hysteresis may be provided for the starting and stopping of the application of the high-frequency voltage. Therefore, frequent abrupt variations in the current due to fluctuations in estimated speed ωr0 can be thus prevented.

Figure 6:
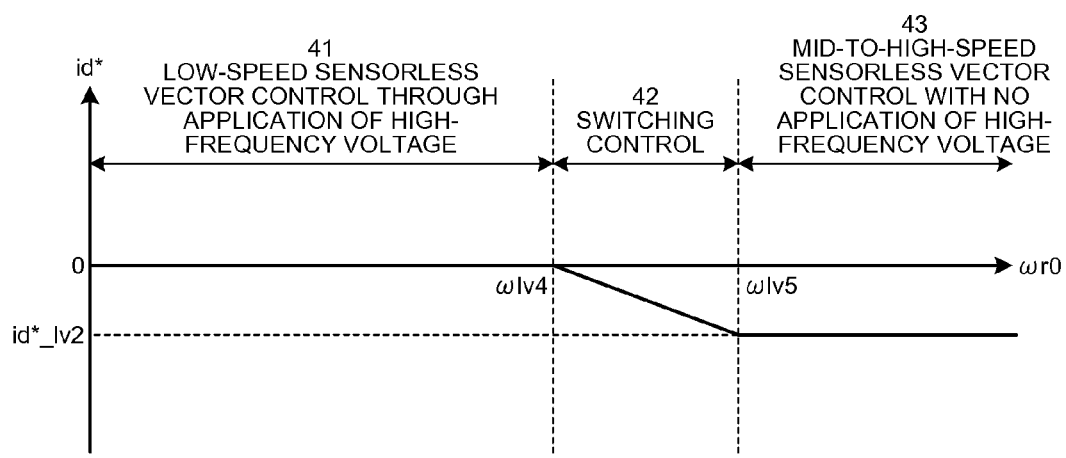
FIG. 6 is a characteristic diagram describing the phases of three control regions selected by a controller illustrated in FIG. 5.

The controller 6b selects from three control methods, namely low-speed sensorless vector control that uses the application of high-frequency voltage, switching control, and mid-to-high-speed sensorless vector control with no application of high-frequency voltage, in accordance with the magnitude of the estimated speed ωr0 estimated by the estimation unit 5b and performs the control illustrated, for example, in FIG. 6. FIG. 6 is a characteristic diagram for describing the phases of the three control regions selected by the controller illustrated in FIG. 5. In FIG. 6, the horizontal axis represents the estimated speed ωr0 output by the estimation unit 5b, and the vertical axis represents the d-axis control current vector command id* created by the d-axis current command calculator 35 on the basis of the estimated speed ωr0.

With reference to the horizontal axis in FIG. 6, the controller 6b selects the low-speed sensorless vector control 41 that uses the application of high-frequency voltage when the absolute value |ωr0| of the estimated speed ωr0 ranges from zero to less than a preset reference value ω1v4; selects the switching control 42 when the absolute value |ωr0| of the estimated speed ωr0 ranges from the reference value ω1v4 to less than a preset reference value ω1v5; and selects the mid-to-high-speed sensorless vector control 43 without applying the high-frequency voltage when the absolute value |ωr0| of the estimated speed ωr0 is equal to or more than a reference value ω1v5. These selections are made so as to perform the selected control in the respective speed periods.

With reference to the vertical axis in FIG. 6, the d-axis current command calculator 35 creates the d-axis control current vector command id* on the basis of the estimated speed ωr0 as a constant value id*_1v1 at zero or near zero used to perform the phase estimation error correction during sensorless vector control in the region with the application of high-frequency voltage (|ωr0|<ω1v4) and as a predetermined value id*_1v2 used to perform the maximum efficiency control or the maximum torque control with no phase estimation error correction performed during sensorless vector control in the region with no application of high-frequency voltage (|ωr0|>ω1v5). The d-axis current command calculator 35 also creates the d-axis control current vector command id* in the switching speed region (ω1v4≤|ωr0|<ω1v5) by allowing it to transit linearly from the constant value id*_1v1 at zero or near zero to the predetermined value id*_1v2 in accordance with the estimated speed ωr0, or by allowing it to transit in accordance with a function of the estimated speed ωr0.

Here, the d-axis current command calculator 35 may obtain the predetermined value id*_1v2 by using an expression (3) when the maximum torque control is performed, and at other times, such as when the maximum efficiency control is performed, the predetermined value id*_1v2 may be set in accordance with the q-axis control current vector command iq* created by the q-axis current command calculator 36 by using an approximation expression, table values, and the like obtained in advance.

$$id^*\_1v2 = \Phi a/\{2(Lq-Ld)\} - \sqrt{[\Phi a^2/\{4(Lq-Ld)^2\} + iq^{*2}]} \quad (3)$$

In the expression (3), Φa represents the armature flux linkage due to the permanent magnet, and Ld and Lq represents the inductance of the d-axis and the q-axis, respectively.

Note that, because the q-axis current command calculator 36 performs proportional integral control such that the speed command ω* matches the estimated speed ψr0 and outputs the control result as the q-axis control current vector command iq*, the q-axis control current vector command iq* and, by extension, the d-axis control current vector command id* both become vibrational if the variability range of the estimated speed ωr0 is large. To prevent this, it is advisable that, when the predetermined value id*_1v2, which is used in the maximum efficiency control, is calculated in accordance with the q-axis control current vector command iq*, the d-axis current command calculator 35 filters the q-axis control current vector command iq*, which is used in the calculation, in order to remove vibrational components.

The current controller 34a in the drive voltage command calculator 34 performs proportional integral control such that the d-axis and q-axis control current vectors id and iq, which are the outputs of the filter 33, match the d-axis and q-axis control current vector commands id* and iq*, and it outputs the control results, as the drive voltage commands Vd* and Vq*, to the coordinate converter 34b and the estimation unit 5b. The coordinate converter 34b converts the drive voltage commands Vd* and Vq* that have been input thereto into the second drive voltage commands Vu*, Vv*, and Vw* on the estimated phase θ0. The adders 31 superimpose the high-frequency voltage commands Vuh, Vvh, and Vwh on the second drive voltage commands Vu*, Vv*, and Vw* so as to produce the first drive voltage commands Vup*, Vvp*, and Vwp*.

As described above, the second embodiment is capable of preventing abrupt variations in the d-axis current command with or without the high-frequency voltage that is applied thereto, and thus it is capable of switching the control smoothly without fluctuations in speed and torque.

In short, the first and second embodiments allow the excitation current command to transit linearly or in accordance with a function of the speed between a value during sensorless vector control and a value during low-speed region control in accordance with the speed command or the estimated speed in a speed region where control is switched or in an adjoining speed region where sensorless vector control is performed, and thus they are capable of preventing abrupt variations in the excitation current before and after the switching of the control and also capable of switching the control smoothly while preventing fluctuations in speed and torque.

INDUSTRIAL APPLICABILITY

As described above, the motor control device according to the present invention is useful as a motor control device capable of restricting abrupt variations in excitation current before and after the switching of the control when a load is applied and is also useful as a motor control device of switching control smoothly without fluctuations in speed and torque.

REFERENCE SIGNS LIST 1a motor (for example, three-phase AC permanent magnet synchronous motor), 1b motor (for example, permanent magnet-embedded synchronous motor), 2a, 2b motor control device, 3 voltage application unit, 4 current detector, 5a, 5b estimation unit, 6a, 6b controller, 10, 11 coordinate converter, 12 current controller, 13 control phase calculator, 14 δ-axis current command calculator, 15 synchronous phase calculator, 16 γ-axis current command calculator, 30 high-frequency voltage generator, 31 adder, 32 coordinate converter, 33 filter, drive voltage command calculator, 34a current controller, 34b coordinate converter, 35 d-axis current command calculator, 36 q-axis current command calculator.

The invention claimed is:

1. A motor control device, comprising:
a voltage converter to apply alternating current (AC) voltage to a motor in accordance with drive voltage commands;
a current detector to detect motor currents flowing through the motor;
an estimator to calculate and output an estimated phase and an estimated speed based on the drive voltage commands and the motor currents, the estimated phase being an estimated value for a rotor position of the motor, the estimated speed being an estimated value for a rotation speed of the motor;
a controller to convert the motor currents into control current vectors based on a control phase, and match the control current vectors to control current vector commands, the control current vectors including a δ-axis control current vector and a γ-axis control current vector, the control current vector commands including a δ-axis control current vector command and a γ-axis control current vector command,
wherein the controller is connected to an outside command source and comprises
a δ-axis current command calculator that creates the δ-axis control current vector command by matching a speed command which is input from an outside source at least to the estimated speed, and
a control phase calculator that switches between a preset synchronous phase and the estimated phase to provide the control phase, and
a γ-axis current command calculator that filters the δ-axis control current vector command and calculates the γ-axis control current vector command based on the filtered δ-axis control current vector command and the speed command which is directly input from the outside command source to the γ-axis current command calculator and the δ-axis current command calculator, even in a case in which a d-axis matches a γ-axis,
wherein the d-axis is parallel to magnetic flux created by a permanent magnet included in a rotor of the motor, a. q-axis is orthogonal to the d-axis, and the γ-axis and a δ-axis are estimated axes corresponding to the d-axis and the q-axis, respectively.

* * * * *